June 18, 1940.  R. B. BLANKE  2,204,787
RADIO ENCLOSURE
Filed Jan. 25, 1939

INVENTOR
Rose Barbara Blanke,

Patented June 18, 1940

2,204,787

UNITED STATES PATENT OFFICE 2,204,787

RADIO ENCLOSURE

Rose Barbara Blanke, Brooklyn, N. Y.

Application January 25, 1939, Serial No. 252,729

1 Claim. (Cl. 116—124.1)

The invention relates to improvements in radio enclosures for the purpose of camouflaging the radio as such giving it the appearance of a small cart loaded with flowers. The objects of the improvement are primarily to provide a very artistic appearance and a less mechanical appearance of any type of small radio chosen for this enclosure, also to conceal the operating mechanism at all times giving only an indirect appearance of the radio dial.

Figure 1:
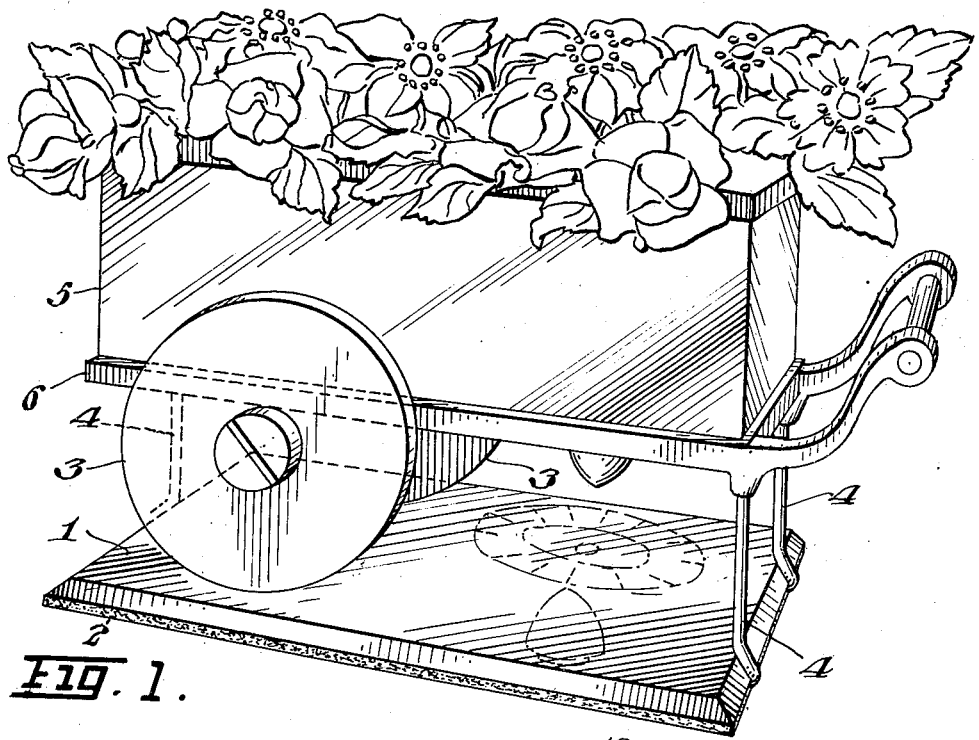
Figure 2:
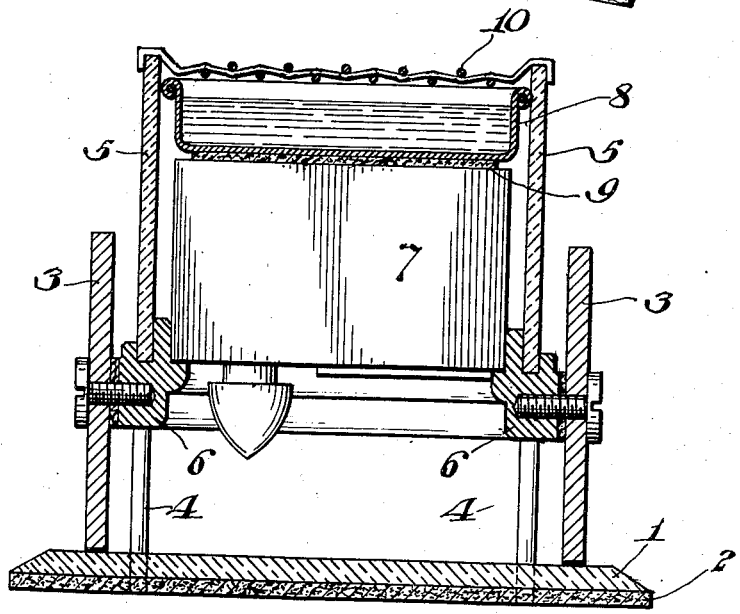

One form of the invention is illustrated in the accompanying drawing, in which Figure 1 is a general perspective of the enclosure containing a radio within and carrying a selection of flowers above, thus becoming a fitting table ornament unsuspected of its mechano-electrical contents. Figure 2 is a cross section vertically through the wheels of the cart-enclosure showing the position of an inverted radio apparatus in the bottom of said cart, and a reflecting mirror directly under the wheels of the cart. The dial of any radio chosen for this purpose should be reversed to facilitate the observation in said mirror located below the cart, otherwise no change or alteration in the radio apparatus is necessary, the enclosure is made to fit any given standard radio in place of the usual cabinet, or to contain both such radio apparatus and its attached cabinet.

A plate-mirror or a metal reflector 1, is placed on a felt cushion 2, fastened to the underside of said reflector forming a base plate. The cart body is resting on said reflector base by means of two wheels 3—3, and fastened by means of the cart legs 4, 4 and 4, bent at their extreme ends to hold the reflector in position. The sides 5, 5 of the cart enclosure are made of mirrors, opaque glass or metal to give an attractive appearance. The sides and the end pieces made of the same material are secured in a frame 6, at the bottom of said cart in which is resting the radio apparatus 7, in a horizontal position.

The space between the reflector 1 and the radio 7, being sufficient for manipulating the controlling knobs of said radio and to observe the dial indirectly through the said reflector under the cart.

In the upper part of said cart-enclosure and above the radio apparatus is located a metal pan 8, containing water for a natural floral display if so chosen. If, however, artificial flowers are preferred, no water will be needed in said pan. As a guard against the heat developed by radio activity an insulating asbestos sheet 9, is attached under the pan 8, above said pan an open wire mesh screen 10 is fitted to the upper edges of the cart for the purpose of holding the flower stems in position over the open pan. The pan 8, with the screen 10, is loosely fitted within the cart enclosure so as to permit the escape of the heat developed by the radio and so as to be easily removed for refilling of water and flowers at any time.

In conclusion I will state that the shape of a carriage has nothing to do with the performance of one, as the carriage-enclosure is fixed to the reflector-base, comprising a stationary table-ornament, and the cart is not intended as a means of transportation.

I am aware that prior to my invention radio enclosures have been made for the purpose of disguising such electrical equipment both more practical and more economical. I therefore do not claim such combination broadly, but I claim:

In a device of the character described, the combination of a supporting base, a reflector associated with the upper surface thereof, a box-like formation open at the top and at the bottom, adapted to receive the radio, with its dial facing downwardly, a frame having an inside flange for receiving and supporting the radio, and an outside flange for receiving and supporting the lower edges of the box-like formation, and means engaging the frame and the base, for supporting the frame in spaced relationship above the base.

R. BARBARA BLANKE.